Nov. 24, 1964 — R. E. WEIMER — 3,158,086
APPARATUS FOR CHARGING HAMBURGER PATTIES ONTO A GRIDDLE
Filed March 21, 1960 — 2 Sheets-Sheet 1

Inventor
Ralph E. Weimer
By: Olson & Trexler attys

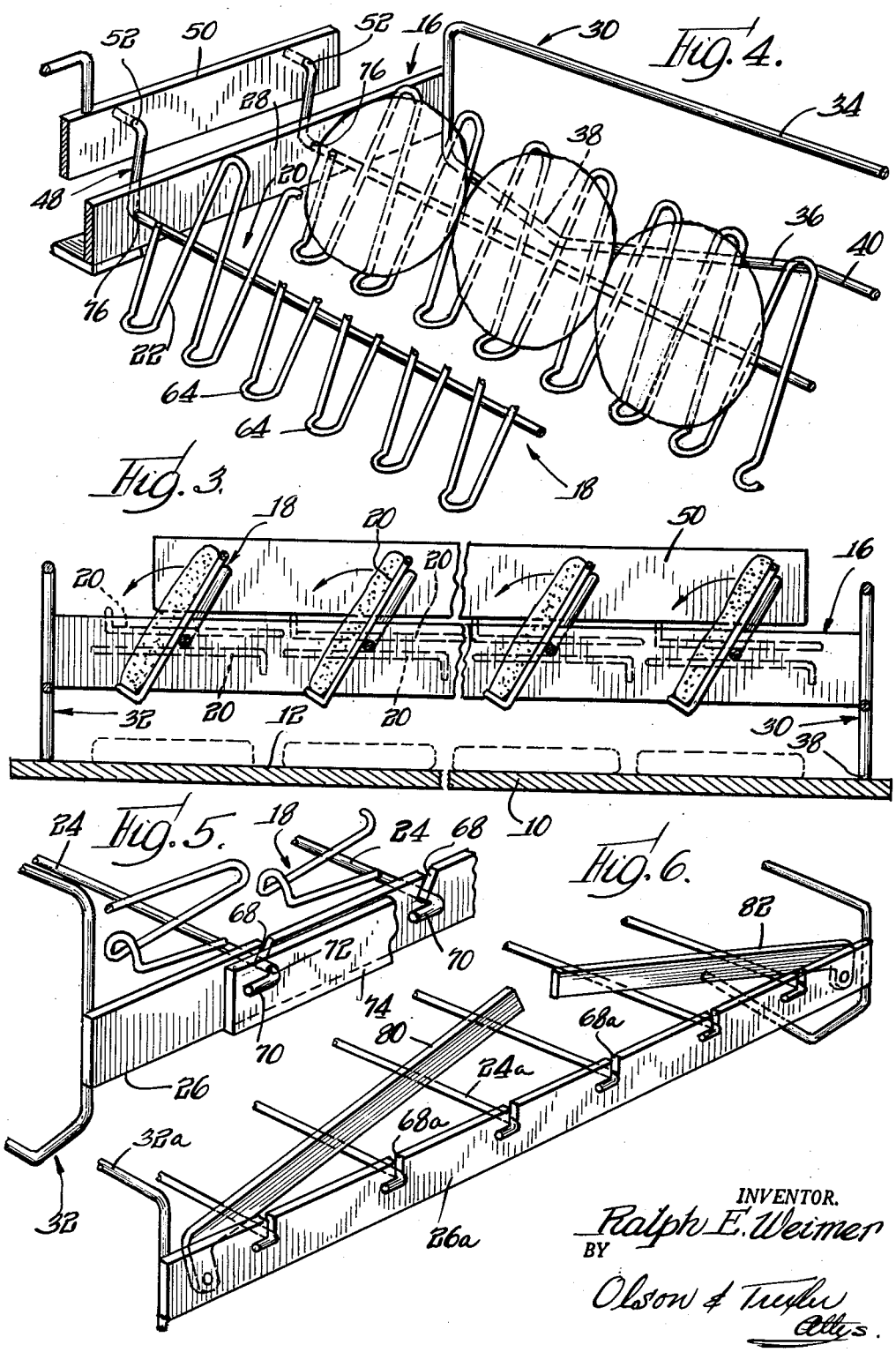

United States Patent Office 3,158,086
Patented Nov. 24, 1964

3,158,086
APPARATUS FOR CHARGING HAMBURGER
PATTIES ONTO A GRIDDLE
Ralph E. Weimer, 1261 Lawler Ave., Lombard, Ill.
Filed Mar. 21, 1960, Ser. No. 16,443
6 Claims. (Cl. 99—423)

The present invention relates to the cooking of hamburger or meat patties in commercial establishments where such patties are cooked in large numbers.

The invention stems from a recognition that the cooking of hamburger patties on a mass production basis in commercial establishments is often attended by inefficiencies and shortcomings inherent in the practices ordinarily used in cooking the patties. Moreover, these inefficiencies and shortcomings, which are the concern of this invention, are aggravated by the fact that the demand for cooked hamburgers may vary radically from a rather low demand during slack hours to a very high peak demand during rush hours. Sometimes it is not possible to satisfy the peak demand for freshly cooked hamburgers by conventional usage of the cooking equipment and working force which can be provided and maintained in such establishments on an economically paying basis.

Thus, the two principal limitations on the rate at which hamburger patties could be cooked in such establishments have been the grill area available for cooking the patties and the number of people available for cooking the patties. The degree to which the grill area can be increased to satisfy the demand for cooked hamburgers is limited by the necessity for economically justifying the cost of providing and maintaining the equipment. The extent to which the rate of cooking patties on a particular grill area can be increased by increasing the number of people assigned to the cooking of the patties is also limited as a practical matter by the costs involved. Moreover, even under the best of conditions with a maximum use of manpower, it is still impossible to fully utilize the cooking potential of a particular grill area, due to the loss of cooking time during the reloading of the grill with raw patties to be cooked.

The loading of a grill with raw patties has previously been a relatively slow inefficient operation which has created inefficiencies in the use of the cook's time and limited the maximum rate patties could be cooked at rush periods. Even though the cook or cooks may work with maximum speed to reload the grill with raw patties at the beginning of the cooking of each batch of patties, there is ordinarily a very inefficient use of the cook's time during the period when a batch of patties are cooking, all of which has increased the effort and cost of cooking hamburgers.

One object of the invention is to sharply increase the rate at which hamburger patties can be cooked on a given grill area and to make more efficient and effective use of the cook's time in cooking hamburger patties on a mass production basis by providing for this purpose a new and highly efficient hamburger loading device which can be preloaded with hamburger patties and operated with great ease and efficiency to cover a large cooking grill with hamburger patties which are placed simultaneously on the grill area in optimum cooking positions in relation to each other.

Another object is to provide, for use with a hamburger grill, a new and improved hamburger loading device which effectively speeds up the maximum over-all rate at which hamburger patties can be cooked on the grill while at the same time distributing the work required more evenly over the time involved and providing in many instances for a significant reduction in the number of people required to cook hamburgers at a given production rate.

A further object is to provide, for use with a hamburger grill, a new and improved hamburger loading device which can be rapidly and properly loaded with a large number of raw hamburger patties while located to one side of the grill, easily moved into overlying relation to the grill, and quickly actuated to place the entire load of patties simultaneously in optimum cooking positions on the grill.

Another object is to substantially increase the over-all rate and efficiency with which hamburger patties can be cooked on a mass production basis by providing a new and improved method of loading the patties onto a cooking grill.

A more specific object is to provide a hamburger load-device of the character recited in which a plurality of invertible loading elements used to support a load of hamburger patties and subsequently deposit the patties on a grill have a new and improved construction which assures a clean separation of the patties from the loading elements to leave the loading elements free of residual meat deposits and assure placement of the patties on the grill in an intact condition.

Another object is to provide a novel hamburger loading device of the above character that has a functional action in depositing hamburger patties on a grill which makes advantageous use of the inertia of the patties to assure clean and uniform movement of the patties from loading elements of the device onto the grill.

A further object is to provide a new and improved hamburger loading device in which the features and advantages recited in the previous objects are provided by a novel and extremely simple structure having a virtually unlimited service life and providing for easy disassembly of the device for cleaning and equally easy reassembly of the device for use.

Other objects and advantages will be apparent from the following description of the exemplary embodiment of the invention illustrated in the drawings, in which:

FIG. 3 is a transverse sectional view of the loading device taken with reference to the line 3—3 in FIG. 1 but showing the device placed on a cooking grill, and illustrating operation of the device to place hamburger patties on the grill;

FIG. 4 is a fragmentary perspective view of the loading device as it appears in FIG. 3;

FIG. 5 is a fragmentary perspective view of one end of the loading device illustrating the manner in which coacting elements are assembled together for ease in assembly and reassembly; and FIG. 6 is a fragmentary and somewhat simplified perspective view illustrating a modified construction at one end of the loading device.

Figures 1, 2:
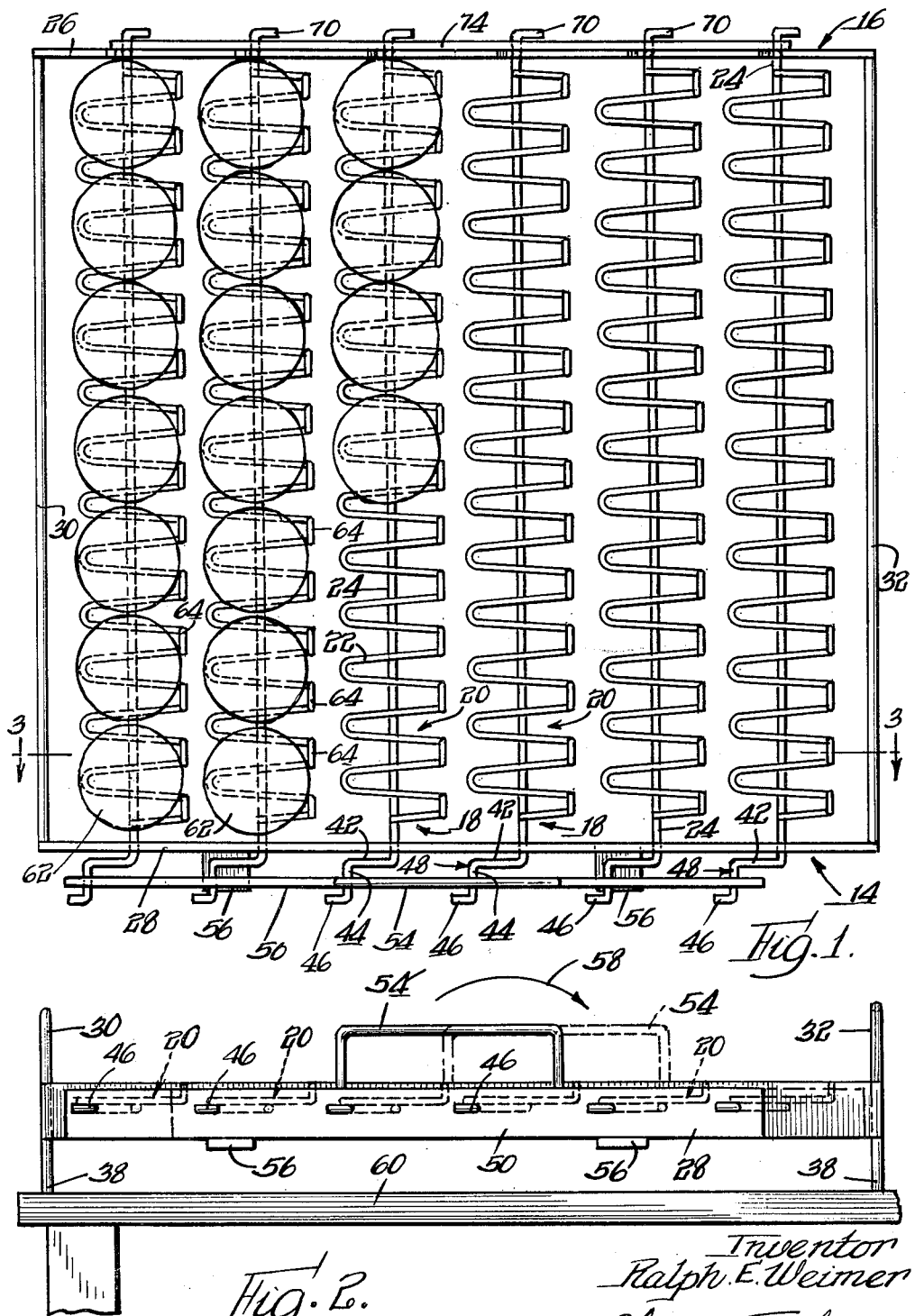
FIGURE 1 is a plan view of a hamburger loading device forming the exemplary embodiment of the invention, which as shown is partially loaded with hamburger patties.
FIG. 2 is an end view of the loading device of FIG. 1 showing the device placed on a horizontal support for loading.

Referring to the drawings in greater detail, a typical cooking grill used in commercial establishments for cooking hamburger patties on a mass production basis is represented in FIG. 3 by a flat plate 10 defining a cooking surface 12 which usually has a rather extensive area. The plate or grill 10 is heated by gas burners, or other suitable heating means of a conventional character, not shown.

Ordinarily, hamburger patties are cooked on the grill 10 in batches. The cooking surface 12 is substantially covered with a batch of patties placed on the area 12 in closely adjacent relation to each other. After a batch of patties is cooked and removed from the grill, the grill surface 12 is cleaned and reloaded with another batch of raw patties, this cycle being repeated as necessary to supply the demand for cooked hamburgers.

The conventional practice has been to place or load the raw hamburger patties onto a grill one at a time. This manual procedure has been a rather slow and time-consuming operation, which is necessarily repeated at the beginning of the cooking of each new batch of patties.

During the rather substantial period of time required to load an extensive grill area with raw hamburger patties placed on the grill one at a time, the grill area which is not covered with patties is not actively in use. This represents a substantial loss in cooking time from the time the first hamburger pattie is placed onto the grill until the last pattie of the batch is loaded onto the grill. The effect of this is to limit the over-all rate at which patties can be cooked on a grill of a given area.

This loss of cooking time which recurs repeatedly at the beginning of the cooking of each new batch of hamburger patties can be reduced somewhat by employing more people to load the patties onto the grill. Yet, this expedient is by its very nature expensive, and often can not be economically justified by the average business of the establishment over the hours which the employees work. In any event, the employment of additional working personnel increases the cost of producing cooked hamburgers.

In following the prior practice of cooking hamburger patties on a mass production basis, the cook or cooks may work feverishly under pressure to get the grill loaded with hamburger patties at the beginning of each cooking cycle. Yet, during the substantial period of time required for a load of hamburgers to cook, the cook may not be fully occupied, which leads to inefficiency in the use of the time of even the most proficient cook.

In accordance with the present invention, the entire grill area, or at least a very extensive portion of the grill area, is covered at once with a batch of raw hamburger patties which are deposited in unison on the grill in optimum cooking position in relation to each other. Moreover, this is accomplished in a manner which enables the grill area to be covered with raw patties immediately after it has been cleaned or otherwise readied to receive a fresh batch of patties.

As will presently appear, this markedly increases the over-all rate at which hamburger patties can be cooked on a grill of a given size, while at the same time more evenly distributing the work over the time involved, to the end that the cooks can work more efficiently under less pressure and produce more cooked hamburger patties for each man hour of the cook's time applied to this operation.

This is accomplished by means of a new and improved device provided by the invention for the specific purpose of loading hamburger patties in batches onto a cooking grill.

In the preferred form illustrated in the drawings, the hamburger pattie loading device 14 provided by the invention for this purpose comprises a rectilinear frame 16. As will presently appear, this frame is designed to be supported in a generally horizontal position on the grill surface 12, or on any other generally horizontal support surface. As viewed from above, the particular frame 16, illustrated in FIG. 1, is substantially square. However, it will be understood that the shape and size of the frame 16 may be designed to conform to the shape and size of the grill to be serviced by the loading device, as will presently appear.

The frame 16 supports a plurality of elongated hamburger loading elements 18 positioned on the frame in generally parallel side-by-side relation to each other, as shown in FIG. 1.

Each loading element defines a generally flat hamburger pattie support face, identified in the drawings by the number 20, which extends longitudinally along one side of the loading element.

The several loading elements 18 are journalled in the frame 16 for rotation between pattie loading positions, illustrated in FIGS. 1 and 2, in which the pattie support faces 20 of the loading elements are turned upwardly, and unloading positions, in which the loading elements are inverted so that the pattie support faces are turned downwardly. Preferably, the rotary movement and positioning of the loading elements 18 are such that the pattie support surfaces 20 have substantially horizontal loading positions, FIGS. 1 and 2, from which the support surfaces are rotated approximately 180° to substantially horizontal unloading positions in which the support faces are inverted to face downwardly. Both the loading and unloading positions of the support faces 20 of the loading elements 18 are illustrated in phantom in FIG. 3. FIGURES 3 and 4 show in solid lines positions of the loading elements 18 in an intermediate phase of the rotary movement of the loading elements from their loading to their unloading positions.

Further, in accordance with the invention, the pattie support face 20 extending longitudinally along each loading element 18 is formed by structure of a special design which provides adequate support for patties placed on the loading element while at the same time providing for clean separation of the patties from the support element, to effect efficient depositing of patties onto an underlying grill in an intact condition, as will be described later in detail. Thus, each support face 20 is formed by structure which provides adequate support to patties placed on the support face, while at the same time leaving the support face largely open. Put another way hamburger patties placed on the support faces 20 are supported by structure of the loading elements 18 which contacts only a very small portion of the underside of each pattie. Moreover, the engagement of the support structure with each pattie, while limited to the small area of the underside of the pattie, is distributed in relation to the pattie so that the pattie is adequately supported, while at the same time kept free of extensive area contact with the underlying support structure.

In the preferred construction illustrated, the pattie support face 20 of each loading element 18 is defined by a single, heavy wire 22 shaped into a generally sinuous form extending longitudinally along the loading element and supported by a longitudinal support bar 24 to which the successive convolutions of the wire are suitably attached, as by brazing, welding or the like. The wire 22 defining each pattie support face 20 has laterally extending excursions to opposite sides of the coacting support bar 24 which define a support face having width sufficient to accommodate hamburger patties of normal size. Moreover, in the preferred form shown, a single complete convolution of the wire 22 on a loading element 18 extends longitudinally along the loading element for a distance equal to approximately one-half of the width of the face surface 20 defined by the wire. This lead of the convoluted or sinuous wire 22 along the length of the loading element provides adequate support to patties, while at the same time assuring clean, intact separation of the patties from the loading elements, as will presently appear.

Opposite ends of the longitudinal support bars 24 of the respective loading elements 18 extend through and are journalled in substantially vertical end plates 26, 28 of the frame 16. As will be described later, the support bars 24 are mounted in the end plates 26, 28 in a manner which provides for easy disassembly of the loading device for cleaning and equally easy reassembly of the device.

It should be observed here that corresponding ends of the frame end plates 26, 28 are connected together by two parallel side members 30, 32 of the frame. These side members 30, 32 are designed to support the frame 16 on an underlying support surface in a position such that the loading elements 18 are supported in vertically spaced relation to the underlying surface. These same side members 30, 32 are also designed to provide convenient handle elements which can be used to great advantage in moving the loading device into and out of overlying relation to a grill.

Thus, in the preferred construction illustrated, the side member 30, shown in FIGS. 1, 2 and 4, is formed from very heavy wire or small round stock shaped into the form of a closed loop. The two members 30 and 32 are identical to each other, each having two longitudinal half-sections which are mirror images of each other.

Opposite ends of the side member 30, for example, are welded to the adjacent ends of the end plates 26, 28. The member 30, which, as previously stated, has the form of a closed loop, comprises a generally horizontal upper run portion 34 adapted to be grasped by the user for lifting the loading device. A lower run portion 36 of the side member 30 is shaped to define two longitudinally spaced, downwardly extending bends 38, only one of which is shown in FIG. 4, adapted to engage an underlying support surface to support the frame, as shown in FIGS. 2 and 3. The depending support bends 38 may be accurately characterized as support feet for the frame 16. A medial portion 40 of the lower run 36 of the member 38 is displaced upwardly toward the upper run 34 and may be grasped by the same hand of the user which is applied to the upper run 34 in lifting of the loading device. As previously stated, the other side member 32 is identical in construction to the side member 30 and is adapted to be grasped for lifting in the same manner.

As best shown in FIG. 1, one end of each loading element support bar 24 is bent at right angles to the support bar to define a crank throw 42 which is generally parallel to the plane of the pattie support surface 20 of the loading element. The outer end of the crank throw 42 on each support bar 24 connects through a right angle bend with a trunnion or journal element 44 substantially parallel to the main portion of the bar 24. The axially outer end of the journal element 44 connects with a lug element 46 extending away from the axis of the main portion of the support bar 24 in parallel relation to the adjacent crank throw element 42.

The elements 42 and 44 of the longitudinal support bars 24 form actuating cranks for the respective loading elements 18. The individual actuating cranks are designated generally by the number 48.

All the loading element actuating cranks 48 are connected to a common actuating link 50, FIGS. 1 to 4, disposed in parallel outwardly spaced relation to the frame member 28. The link 50 defines a plurality of longitudinally spaced apertures 52 adapted to receive the journal elements 44 of the cranks.

The link 50 is assembled onto the cranks 48 by turning the cranks into positions in which they project upwardly in perpendicular relation to the frame member 28. The link 50 is then turned into a horizontal position, and all the lugs 46 on the extreme ends of the cranks are fitted into the link openings 52. The link is then moved downwardly over the lugs 46 and turned into a vertical position in which the cranks or journal elements 44 are received into the openings 52, as illustrated in FIG. 4. The significance of this construction in providing for easy assembly and disassembly of the loading device will be referred to later.

A handle 54 extending upwardly from the mid-portion of the link 50 is used in shifting the link from one operating position to another, as will presently appear.

The positional relationship of the cranks 46 to the loading elements 18 is such that the cranks occupy a generally horizontal position when the loading elements are in either their loading or unloading positions previously referred to. When the cranks 48 are in their horizontal positions, the link 50 is supported by two support lugs 56, FIGS. 1, 2 and 4, which project outwardly from the lower edge of the frame member into underlying relation to the link.

The weight of the link 50 which is relatively massive, normally holds the link against the lugs 56 to hold the coacting loading elements 18 in either their loading or unloading positions.

To rotate the loading elements 18 from one position to another, the actuating link 50 is shifted longitudinally through an upwardly arched path in which the link moves upwardly from the lugs 56 through an overcentered position, and downwardly back into engagement with the lugs 56. The arcuate movement of the link 50 and handle 54 in inverting the loading elements 18 is illustrated by the arrow 58, in FIG. 2.

In use, the hamburger pattie loading device 14 is normally supported on a table 60, or the like, FIG. 2. The loading elements 18 are turned into their loading positions and loaded with a large number of hamburger patties 62 which are placed on the loading elements 18 in closely adjacent relation to each other, as shown in FIG. 1, which illustrates the loading device in a partially loaded condition. Each loading element 18 supports a row of patties which are placed on the loading element space in side-by-side relation to each other.

It should be pointed out here that loading of the patties onto the loading elements 18 is facilitated by a shaping of the loading element structure to define pattie alinement abutments 64 which project outwardly from the face 20 of each loading element along one longitudinal side of the loading element face. In the construction illustrated, these alinement abutments 64 are formed by turning the adjacent convolutions of the wire element 22 of each support element upwardly along one longitudinal edge of the support elements.

The abutments 64 thus formed serve to guide and aid the user in properly locating the patties laterally with respect to the loading elements 18 as they are placed on the loading elements.

Ordinarily, the user will load the loading device 14 with raw hamburger patties while a previous batch of patties is cooking on the grill 10. This is usually a slack period during which the cook has time to spare for this purpose.

After the cooking grill 10 has been readied to receive a new batch of patties, the cook has merely to grasp the side members 30, 32 of the loading device and lift the device onto the grill, whereupon the handle 54 is quickly operated to invert the loading elements 18, causing all the patties to be deposited in unison onto the underlying grill surface 12 in optimum cooking positions relative to each other. This whole operation is accomplished in a matter of seconds with very little effort and makes immediate use of the entire area of the grill for cooking patties. It will be understood that for exceptionally large grills two or more loading devices may be provided for loading the grill, or a loading device equal in size to the grill may be provided.

By virtue of the improved construction of the loading elements 18 previously described, the patties 62 have a clean separation from the loading elements to leave the latter free of meat deposits as the patties drop onto the grill. In this connection, it will be appreciated that the weight of the operating link 50 tends to accelerate movement of the loading devices 18 as they approach their inverted positions. This tendency, together with the sudden abutment of the link 50 against the stops 56 serves, in conjunction with the inertia of the patties 62, to assure a clean departure of the patties from the loading elements.

The loading device is then refilled with patties in readiness for reloading the grill.

As previously intimated, the loading device 14 may be readily disassembled for cleaning.

The ends of the loading element support bars 24 opposite from the link 50 rest in longitudinally spaced slots 68, FIG. 5, in the frame plate 26. Lugs 70 formed on these ends of the bars 24 fit into apertures 72 in a retaining link 74 which holds the bars 24 down in the slots 68.

To disassemble the loading device, the link 50 is lifted to turn the cranks 48 into vertical positions. The link 74 is lifted, to disengage the bars 24 from the slots 68, and turned to a horizontal position, to be moved out over the lugs 70. The link 50 is turned into a horizontal position and moved out over the crank lugs 46. After removal of both links 50 and 74, the cranks 48 are retracted through support openings 76 in the frame plate 28.

Thus, the loading device is completely disassembled by a simple manipulation of the parts, without any necessity for releasing fastener devices which are completely eliminated in the construction of the loading device. This facilitates cleaning of the structure, which can be readily reassembled for use.

FIG. 6 illustrates a modified construction in which components corresponding to those of the loading device just described are identified with the same reference numerals with the addition of the suffix "a." In this form, the retaining link 74 is replaced by two weighted arms 80, 82 swingably mounted on the frame plate 26a, to overlie the loading element support bars 24a and hold the latter in the slots 68a. The arms 80, 82 can be easily lifted up to release the support bars 24a for removal.

It will be appreciated that the invention is not limited necessarily to use of the construction described, but includes the use of variants and alternatives within the spirit and scope of the invention as defined by the claims.

The invention is claimed as follows:

1. For loading a large number of hamburger patties in unison onto a hamburger grill, a hamburger loading device comprising, in combination, a generally rectilinear support frame adapted to be moved into and out of overlying relation to a hamburger grill, a plurality of elongated hamburger loading elements disposed on said frame in side-by-side relation to each other; each of said loading elements having a generally coplanar, fenestrated patty support face of rectangular form extending longitudinally along one side of the loading element and having a width which is substantially uniform throughout the length of the support face; the patty support face of each loading element being defined by narrow patty support surfaces on the support element having a proximate patty supporting relation to the support face and being arranged in a pattern which defines in the support face open areas intervening between the support surfaces for the face and being free of structure having a patty supporting relationship to the support face, said patty support surfaces for each face having a width which is only a minor fraction of the width of the open areas intervening between the support surfaces, said loading device defining a hamburger depositing space unobstructed by structure of the loading device and extending with reference to the loading device an unlimited distance downwardly from the structure of said loading elements defining said support faces, means for supporting said respective patty loading elements on said frame for rotation between loading positions in which the support faces thereof face upwardly for supporting patties placed thereon and unloading positions in which the support faces thereof face downwardly for dumping patties from said faces, operating cranks connected to said respective loading elements, a weighted operating link interconnected with all of said cranks to rotate said loading elements in unison, abutment means coacting with said link to support the latter when said loading elements are positioned by said link and said cranks in either the loading or unloading positions of the loading elements, and said cranks being shaped in relation to said loading elements and said link to cause the center of gravity of said link to move through an upwardly arched path as an incident to movement of said loading elements between said loading and unloading positions thereof whereby said loading elements are urged into either of said loading or unloading positions thereof by the force of gravity on said link.

2. For use in making cooking hamburger patties in large numbers, a hamburger patty loading device adapted to deposit a plurality of hamburger patties at once in optimum cooking positions on a cooking grill or the like and comprising, in combination, a frame movable into and out of overlying relation to a cooking surface, a plurality of hamburger patty loading elements disposed on said frame alongside each other; each of said loading elements including hamburger patty support structure formed of wire and defining an elongated, fenestrated patty support face extending longitudinally along one side of the loading element and having a width which is substantially uniform throughout the length of the support face, means supporting said respective loading elements on said frame for rotation between the patty loading positions in which said support faces face upwardly for supporting patties and patty unloading positions in which the support faces face downwardly in generally horizontal positions for dumping patties, actuating means connected with all of said loading elements to rotate the latter in unison between said loading and unloading positions thereof, and said frame being shaped to define an unobstructed patty depositing space extending from the structure of said loading elements defining said support faces downwardly to the extreme lowermost portion of the loading device.

3. For use in cooking hamburger patties on a mass production basis, a patty loading device comprising, in combination, a support frame adapted to be moved into and out of overlying relation to a cooking grill, a plurality of elongated patty loading elements disposed on said frame in side-by-side relation to each other, each loading element comprising a longitudinal support bar and a sinuous wire element secured to said support bar to define a longitudinal patty support face extending longitudinally along the loading element, each of said loading elements being removably mounted in said frame for rotation between a loading position in which the support face of the loading element faces upwardly for supporting patties and an unloading position in which the support face faces downwardly for dumping patties, one end of the longitudinal support bar of each loading element extending through a coacting support element of said frame and being shaped to define an operation crank for rotating the loading element, an actuating link removably secured to the actuating cranks of all of said loading elements to rotate the latter in unison between said loading and unloading positions thereof, the ends of said loading element longitudinal support bars opposite from said cranks extending into slots in a support element of said frame, hold down weights engaging said last mentioned ends of said loading element support bars to hold the latter in said slots, and said loading device including said frame defining a bottomless unobstructed patty depositing space extending downwardly from said loading elements.

4. For use in speeding up and making more efficient the cooking of hamburger patties on a mass production basis, a hamburger patty loading device adapted to be moved temporarily into overlying relation to a cooking grill and comprising a rectilinear support frame, downwardly extending feet elements on said frame adapted to support the frame on an underlying support surface, a plurality of elongated patty loading elements disposed in said frame in side-by-side relation to each other, said loading device including said frame defining a bottomless unobstructed patty depositing space extending downwardly from said loading elements, each of said loading elements comprising a longitudinal support bar journalled rotatably on said frame and a sinuous wire element fixed to said longitudinal support bar to define a fenestrated support face extending longitudinally along the support bar, said support face of each loading element having a width which is substantially uniform throughout the length thereof, each of said support surfaces being defined by narrow wire support surfaces and a pattern of open areas intervening between the support surfaces, said wire element of each loading element being shaped to define patty locating abutments located along one longitudinal side of the loading element and projecting outwardly from the loading element support face at a sharp angle thereto, and actuating means interconnected with said support bars of said loading elements to rotate the loading elements between loading positions in which the support faces face upwardly for supporting patties and patty depositing positions in which the support faces of the loading elements face downwardly in generally horizontal positions for dumping patties through said space.

5. For use in cooking hamburger patties on a mass production basis, a patty loading device comprising, in combination, a rectilinear support frame adapted to be moved into and out of overlying relation to a cook grill, a plurality of elongated patty loading elements disposed on said frame in side-by-side relation to each other, said loading device including said frame defining a bottomless unobstructed patty depositing space extending downwardly from said loading elements, each loading element comprising a longitudinal support bar and a sinuous wire element secured to said support bar to define a longitudinal patty support face extending longitudinally along the loading element, each of said loading elements being rotatably mounted in said frame for rotation between a loading position in which the support face of the loading element faces upwardly for supporting patties and an unloading position in which the support face faces downwardly for dumping patties, one end of the longitudinal support bar of each loading element being shaped to define an operating crank for rotating the loading element, said cranks being inserted through a coacting support element of said frame, an actuating link connected to the actuating cranks of all of said loading elements to rotate the latter in unison between said loading and unloading positions thereof, link retaining lugs on the ends of said cranks, the ends of said loading element support bars opposite from said cranks extending into slots in a support element of said frame, and a weight pivoted to said frame and engaging said loading element bars to hold the latter in said slots.

6. For use in loading raw meat patties onto a cooking surface, a raw meat patty loading device adapted to be moved temporarily into overlying relation to a cooking surface and comprising a rectilinear support frame, support elements on said frame adapted to support the frame on an underlying support surface, a plurality of elongated patty loading elements disposed on said frame alongside each other; each of said loading elements having a fenestrated, substantially coplanar patty support face defined by patty support surfaces on the loading element having a proximate patty supporting relation to the support face and being arranged in a pattern which defines in the face open areas intervening between the patty support surfaces for the face and being free of support structure having a patty supporting relationship to the support face; said patty support surfaces of each face having minimum dimensions in directions parallel to the support face which are only a fraction of the minimum dimensions of said open areas in directions parallel to the support face, said patty support surfaces for each face having a cumulative area which is only a small fraction of the cumulative area of said open areas of the face, the patty support face of each loading element being rectangular in form and having a substantially uniform width throughout the length thereof, means supporting said respective loading elements on said frame for rotation between patty loading positions in which the faces face upwardly for supporting patties and patty unloading positions in which the support faces face downwardly in generally horizontal positions for dumping patties, actuating means coacting with all of said loading elements to rotate the latter in unison between said loading and unloading positions thereof, and said frame being shaped to define an unobstructed patty depositing space extending from the structure of said loading elements defining said support faces downwardly to the extreme lowermost portion of the loading device.

References Cited in the file of this patent

UNITED STATES PATENTS

| 859,717 | Zinn | July 9, 1907 |
| 2,332,117 | Shepherd | Oct. 19, 1943 |
| 2,824,510 | Gangwer | Feb. 25, 1958 |
| 2,867,163 | Bloom | Jan. 6, 1959 |

FOREIGN PATENTS

| 363,792 | Great Britain | Dec. 31, 1931 |